United States Patent
Sorge et al.

(10) Patent No.: US 6,565,609 B1
(45) Date of Patent: May 20, 2003

(54) TRANSLATING DATA INTO HTML WHILE RETAINING FORMATTING AND FUNCTIONALITY FOR RETURNING THE TRANSLATED DATA TO A PARENT APPLICATION

(75) Inventors: Terri L. Sorge, Kirkland, WA (US); Kevin J. Fischer, Redmond, WA (US); Rajeev S. Misra, Redmond, WA (US); Anna V. Timasheva, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/333,755

(22) Filed: Jun. 15, 1999

(51) Int. Cl.[7] .......................... G06F 12/00; G06F 17/30

(52) U.S. Cl. ..................... 715/503; 715/513; 715/523

(58) Field of Search ............................... 707/503, 513; 715/523

(56) References Cited

U.S. PATENT DOCUMENTS

| 5,893,127 | A | * | 4/1999 | Tyan et al. | 382/176 |
|---|---|---|---|---|---|
| 5,903,889 | A | * | 5/1999 | de la Huerga et al. | 707/10 |
| 6,078,924 | A | * | 6/2000 | Ainsbury et al. | 707/101 |
| 6,247,018 | B1 | * | 6/2001 | Rheaume | 707/102 |
| 6,311,196 | B1 | * | 10/2001 | Arora et al. | 345/764 |
| 6,336,124 | B1 | * | 1/2002 | Alam et al. | 707/523 |
| 6,389,437 | B2 | * | 5/2002 | Stoub | 345/760 |
| 6,397,219 | B2 | * | 5/2002 | Mills | 707/10 |

OTHER PUBLICATIONS

Ouahid et al., "Converting Web Pages into Well–formed XML Documents", Jun. 1999, 1999 IEEE International Conference on Communications, 1999, vol. 1, pp. 676–680.*

* cited by examiner

Primary Examiner—Stephen S. Hong
Assistant Examiner—Almari Romero
(74) Attorney, Agent, or Firm—Ronald M. Anderson

(57) ABSTRACT

A method for enabling data generated in a parent application to be translated into another format, such as hypertext markup language (HTML), so that formatting functionality unique to the parent application is retained, and so that the data reintroduced into the parent application from an HTML document has all its original formatting and functionality restored. As the data are translated into the other format, formatting information specific to the parent application is included with the data, but in such a manner that the formatting information is ignored by applications such as web browsers that are compatible with the other format. While translating the data into the other format, any formatting commands in the data that are not fully supported in the other format are identified, and if found, are translated so as to emulate the form of the data in the parent application. Included in the translated data is a marker identifying changes in the formatting commands. When the translated data are reintroduced to the parent application, the parent application ignores the non-identical formatting indicated by the marker and instead uses the original formatting information that was included in the translated data. The method can be used to reduce the size of an HTML file that includes translated spreadsheet data by abbreviating the HTML code for empty cells, while ensuring that when translated spreadsheet data are reintroduced into a parent spreadsheet application, the original formatting and functionality of the spreadsheet data are maintained.

49 Claims, 3 Drawing Sheets

Figure 1:
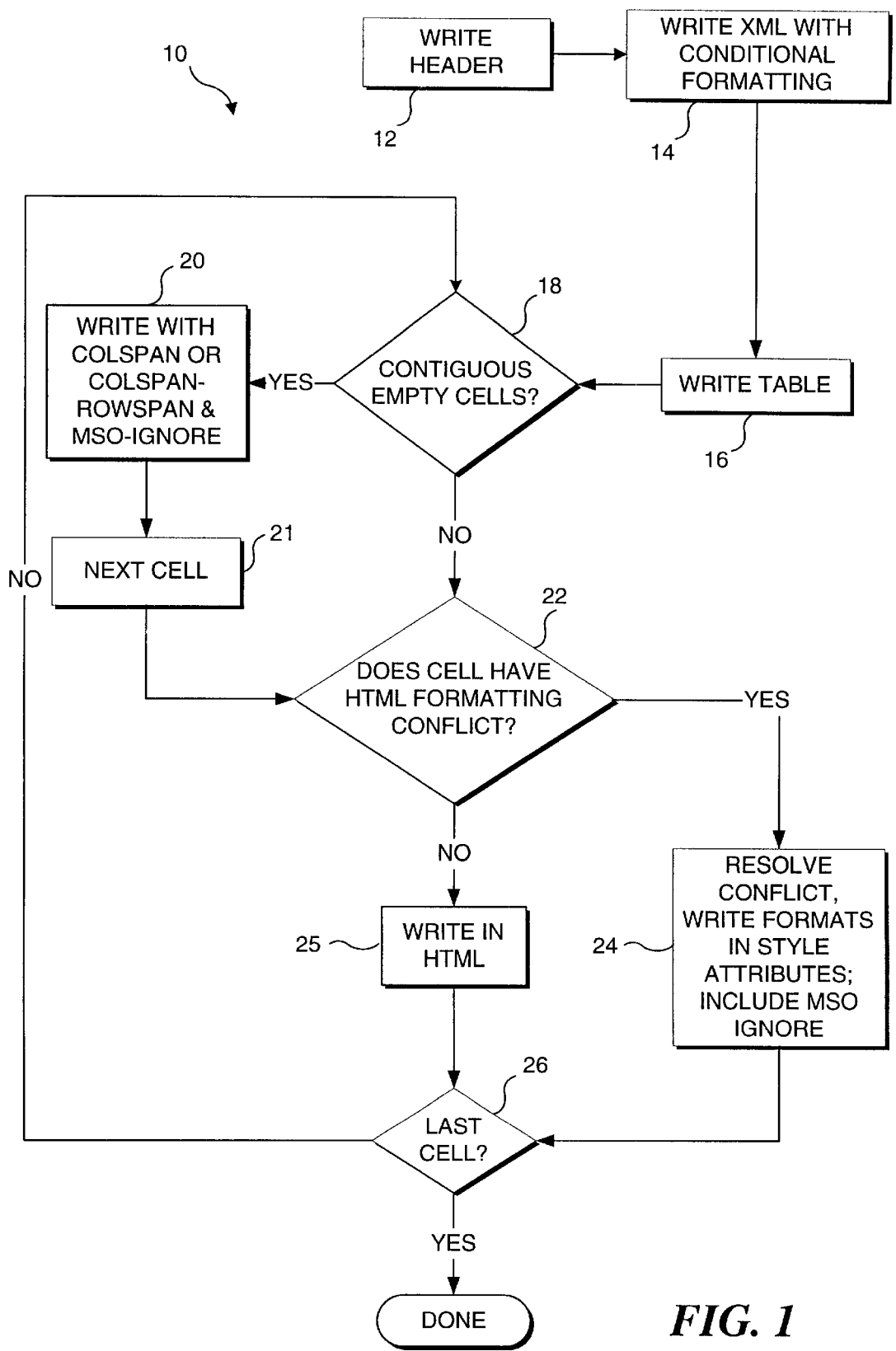

TRANSLATING DATA INTO HTML WHILE RETAINING FORMATTING AND FUNCTIONALITY FOR RETURNING THE TRANSLATED DATA TO A PARENT APPLICATION

FIELD OF THE INVENTION

The present invention generally pertains to a method for translating data produced in a first program into a format required for use in a second program, and more specifically, to a method for ensuring that data translated from a program used to create the data into a hypertext markup language (HTML) format retain formatting and functionality during the translation.

BACKGROUND OF THE INVENTION

A characteristic of many applications programs is that they produce data in a format that is specific to some functionality of the application program. Loss of functionality in data translated from one format to another will not always be immediately apparent. For example, in Microsoft Corporation's EXCEL™ spreadsheet program, a red color font may be applied to a number in a cell to indicate that the value is negative, in accord with defined Number Formatting Rules. However, a value may be shown in a red color font in another cell of the spreadsheet simply because a user arbitrarily selected red formatting for the font in that cell. If this spreadsheet is then translated to HTML format under prior art methods, the functional formatting indicative of a negative value will be lost. Although any values that were in a red font in the spreadsheet cells will also be in a red font in the translated data within an HTML document, the HTML document will not associate a negative value with the red font in those cells where this functionality existed in the original spreadsheet. If it becomes necessary to transfer the translated data from the HTML document back into a spreadsheet, the loss of the negative value functionality in those cells where the red font was originally used to indicate a negative value will cause the resulting spreadsheet to inaccurately represent the data. Understanding how this problem might be addressed requires a brief discussion of the use and format of HTML documents.

With the widespread use of the Internet and of corporate or business intranets, it is becoming increasingly common to translate data from application-specific file formats into HTML file formats, to enable the data to be readily transmitted over a network and viewed in browser programs. HTML documents or files have thus become the universally accepted format for sharing data "on-line." An on-line information system typically includes a server computer system that makes information available so that client computer systems can access the information. The server and client computer systems are usually connected in either a local area or a wide area private intranet system, or via the public Internet. A unique uniform resource locator (URL) is associated with each HTML document, enabling client computer systems to request a specific HTML document from a server computer system.

An HTML document includes a hierarchical set of markup elements; most elements have a start tag, followed by content, followed by an end tag. The content is typically a combination of text and nested markup elements. Tags, which are enclosed in angle brackets ('<' and '>'), indicate how the document is structured and how to display the document, i.e., its format. There are tags for markup elements such as titles and headers, for text attributes such as bold and italic, for lists, for paragraph boundaries, for links to other documents or other parts of the same document; for graphic images, for non-displayed comments, and for many other features. Further details regarding HTML may be found in reference books such as "HTML For Dummies," by Ed Tittel and Steve James (1996).

The following lines of HTML briefly illustrate how the language is used:

Here we start a new paragraph <P>.

Some words are <B>bold</B>, others are <I>italic</I>.

The viewer of the document will see:

Here we start a new paragraph.

Some words are bold, others are italic.

As noted above, a user who wishes to retrieve and display an HTML document generally uses a Web browser program. Two of the popular Web browser programs are: NAVIGATOR™ from NetScape Communications Corp. of Mountain View, Calif., and INTERNET EXPLORER from Microsoft Corporation of Redmond, Wash. The primary functionality of web browsers is directed to finding, retrieving, and displaying documents. A browser is generally not intended for word processing or data manipulation of the information contained within an HTML document, but can display documents or data generated by word processing or spreadsheet applications, once converted into an appropriate HTML compatible format.

A wide variety of data may be shared among different users in a network environment using HTML. Typical HTML documents include images, text, and data. HTML documents can be created using programs specifically designed for that purpose, such as Microsoft Corporation's FRONTPAGE™ Web Page publishing program. Additionally, some applications, such as Microsoft Corporation's WORD 97™ word processing program, allow a user to save a text document as an HTML document. Microsoft Corporation's EXCEL 97™ spreadsheet program also enables a user to save a data table or chart created in a workbook as an HTML file.

As noted above, a characteristic of many application programs is specific formatting of data that is unique to some functionality of that application. It would be desirable to persist application-specific formatting information when translating data from one file format to a different file format, such as the HTML format, so that the data could be reintroduced into the original application with all its original formatting and functionality intact.

In addition to the functionality related to indicating negative numbers with a red font noted above, there are additional EXCEL spreadsheet functions that may be similarly adversely affected by translation into another format such as HTML. In EXCEL 97, text that exceeds the width of a column may be displayed as spilling into an adjacent cell to the right, without actually being merged into that adjacent cell. HTML does not support this function, and will instead treat the text displayed across two cells as being merged into the two cells. It would be desirable that when such "spilled text" is translated into HTML, the "spilled text" formatting information is retained in the HTML file, even if it is not supported in HTML, so that if the HTML file is translated back into the parent EXCEL spreadsheet application, the "spilled text" is correctly formatted as being associated with only one cell.

Currently when a data table is translated into HTML, any empty cells or white space in the data table require a significant amount of coding to be correctly represented in the HTML document. Data tables can often have a significant amount of such empty space. Thus, a table containing relatively little data, yet many empty cells, can generate a relatively large HTML document when translated into HTML format. Clearly, it would be desirable to improve the speed with which the translated data table inserted in an HTML document is rendered by a browser and reduce the amount of HTML coding data (file size) required to define empty cells in a block of cells imported into a web page, while at the same time ensuring that the spreadsheet specific formatting is retained if it becomes necessary to reintroduce the data table from the HTML document back into an EXCEL spreadsheet.

Another aspect of translating a data table from a spreadsheet file format into HTML format is that the appearance of a data table as displayed in the HTML document is often less aesthetic than the appearance of the data table in its parent application. This loss of appearance quality is primarily due to the positioning of the text in the data tables as displayed in HTML. Generally, the text is displayed immediately next to a border of a cell, often making the text difficult to read, because it runs into the contents of the adjacent cell. It would be desirable to be able to add padding (empty spaces) so that text in data tables is easier to read when translating a data table from a spreadsheet application file format into HTML format, and it would be further desirable that such padding not interfere with the appearance of the data table if it is translated back into its parent spreadsheet application from the HTML format.

SUMMARY OF THE INVENTION

In accord with the present invention, a method is defined for translating data having a format and functionality specific to a parent application into a different application format, such that any formatting changes required to translate the data into the different application format are reversible, enabling the data to be reintroduced into the parent application without loss of the format and functionality that the data previously exhibited in the parent application. The method includes the step enabling a user to select the data to be translated, from within the parent application. The data selected are translated from the parent application format into the different application format. Included within the translated data is a marker associated with each formatting change required to resolve any conflicts between a first format and first functionality available in the parent application, and a second format and second functionality available in the different application. The data translated into the different application format are then included within a file of the different application. Subsequently, a user is enabled to reintroduce the data that were translated, into the parent application. Wherever a marker denoting a formatting change is found in the data being reintroduced, that formatting change is ignored by the parent application; however, the first format and first functionality is reapplied to the data reintroduced into the parent application.

The step of incorporating the data that were translated into the file of the different application provides for including the first format and first functionality information within that file, but in a way that the first format and first functionality information is ignored by the different application. The step of enabling a user to reintroduce the data into the parent application includes the step of using the first format and first functionality information to recreate the original formatting of the data.

The parent application preferably comprises a spreadsheet program, in which case, the data that are translated are selected from a spreadsheet and include either a data table or a chart. However, other types of parent applications are contemplated.

Also, in a preferred embodiment of the present invention, the different application format includes components of HTML. Any formatting changes are then made using at least one of the group including HTML tags, attributes, and cascading style sheet (CSS) properties.

The marker associated with any formatting change preferably comprises a CSS property. The CSS property comprising the marker is then preferably an MSO-Ignore property.

Formatting change may include adding padding so that the data are more aesthetically displayed in a browser. The conflict between the format and functionality originally associated with the data in the parent application and the format and functionality available in the different application may arise due to spilled text, and if so, the formatting change preferably comprises using a colspan attribute.

When a conflict between the format and functionality originally associated with the data in the parent application and the format and functionality available in the different application arises due to a formatting command in the parent application that is specific to a function of the data, the method further provides for including the formatting command within the data being translated into the different application format in a form, such that the formatting command is ignored by the different application. The formatting command is then available to recreate the original formatting of the data if a user reintroduces the data into the parent application.

In one preferred form of the invention, the formatting command is defined by a user of the parent application. In one instance, the formatting command changes the appearance of the data in the parent application if the data change between negative and positive values.

The step of translating the data may further include the step of identifying any contiguous empty cells in the data selected from the spreadsheet. The HTML required to define the empty cells is then abbreviated by using a colspan attribute and/or a rowspan attribute.

It is also possible that a conflict between the format and functionality originally associated with the data in the parent application and the format and functionality available in the different application arises due to data that include either a shape or an image.

Another aspect of the present invention is directed to an article of manufacture that includes a medium in which machine instructions are stored that cause a computer to implement functions generally consistent with the steps of the method discussed above.

A still further aspect of the present invention is directed to a system for enabling formatting and functionality information to be persisted when data having a first format used by a parent application are translated into a second format, different from the first format, required of another application. The data translated can be returned to the parent application without loss of any format and any functionality that the data had in the first format. This system includes a memory in which a plurality of machine instructions are stored, a display, and a process coupled to the memory and the display. The processor executes the machine instructions to implement functions that are generally consistent with the steps of the method discussed above.

BRIEF DESCRIPTION OF THE DRAWING FIGURES

Figure 2:
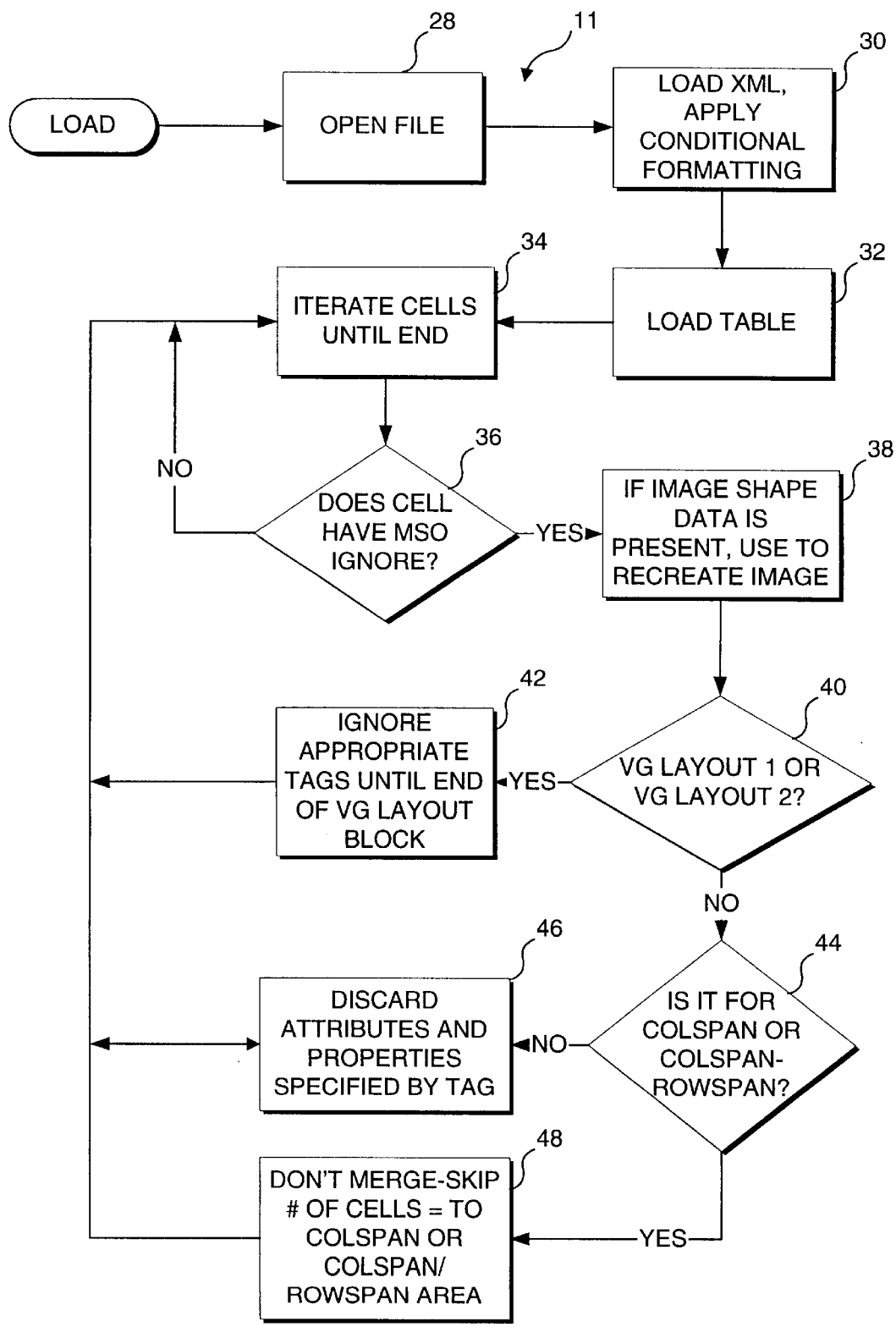
Figure 3:
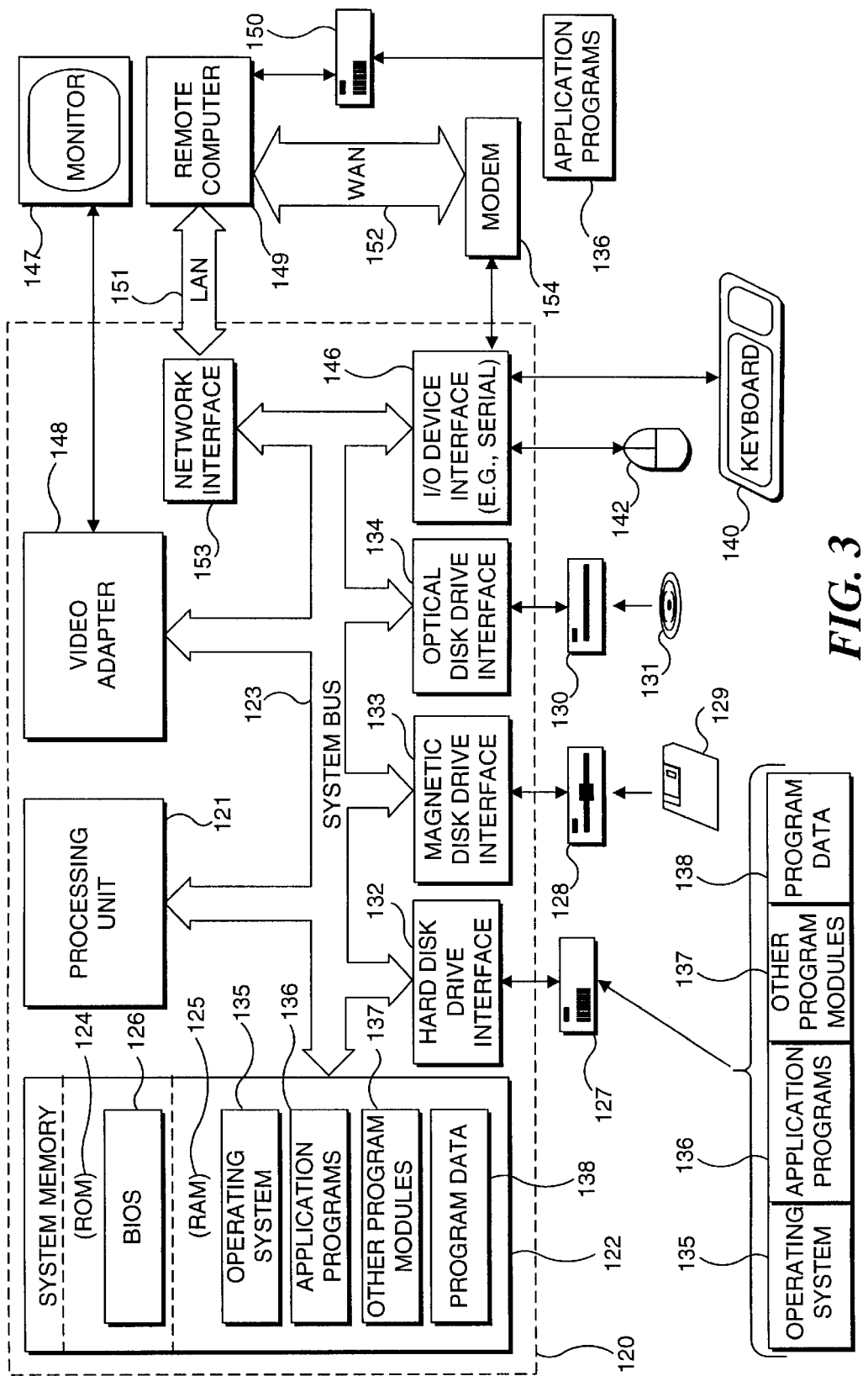

The foregoing aspects and many of the attendant advantages of this invention will become more readily appreciated as the same becomes better understood by reference to the following detailed description, when taken in conjunction with the accompanying drawings, wherein:

FIG. 1 is a flow chart illustrating the logical steps implemented to include an MSO-Ignore property with data translated from an EXCEL 2000™ format into an HTML format in accord with the present invention;

FIG. 2 is a flow chart diagram illustrating the logical steps implemented to open an HTML document that contains data originally translated from EXCEL 2000 into HTML, and to return the data to its original formatting condition so that no formatting or functionality is lost when the data in the HTML document are reintroduced into an EXCEL 2000 spreadsheet, in accord with the present invention; and FIG. 3 is a block diagram of a personal computer system suitable for implementing the present invention.

DESCRIPTION OF THE PREFERRED EMBODIMENT

A preferred embodiment of the present invention will be included in the EXCEL 2000 spreadsheet program, which will be distributed by Microsoft Corporation as part of its OFFICE 2000™ product line. As implemented therein, the present invention will enable a user or creator of a spreadsheet to insert a data table from the spreadsheet into an HTML document, such that the data table in the HTML document can be introduced back into the spreadsheet application, without loss of formatting or functionality. The prior art has allowed users to insert data tables into HTML documents; however, the data tables thus inserted into an HTML document did not consistently retain all formatting information associated with the data table not supported by HTML, and did not retain all functionality specific to the parent application.

Before explaining how these features are implemented, it will be helpful to define several terms. The term "HTML document" as used herein and in the claims that follow means a file that includes HTML content, which is intended to be viewed or displayed with a Web browser. The HTML document may be a new HTML document created when a file from a parent application is translated into HTML format, or the HTML document may be an existing HTML document to which the new data content is being added from a parent application. The term "data" as used herein and in the claims that follow means any information produced by a spreadsheet, database, or word processing application, such as tables, charts, text, or images. The following example of a preferred embodiment of the present invention is disclosed in regard to a spreadsheet application, generally as will be implemented in Microsoft Corporation's EXCEL 2000 spreadsheet application; however, it is not intended that the invention be limited to this application, since it can be clearly applied to other types of data, created in other types of applications. While it is understood that it preferable to use a trademark such as EXCEL 2000 as an adjective in connection with the type of product to which it is applied, for simplicity, all further references to this program in the following description will simply refer to this application as "EXCEL 2000," omitting reference to the term "spreadsheet program" and the "™" symbol.

HTML is a relatively simple language used to create hypertext documents that are portable from one computer platform to another. The Extensible Markup Language (XML) describes a class of data objects called XML documents, which are stored on computers, and partially describes the behavior of programs that process these objects. XML is a subset or restricted form of SGML, the Standard Generalized Markup Language (ISO 8879). The goal of XML is to enable generic SGML to be served, received, and processed on the Web or other network in the way that is now possible with HTML. XML has been designed for ease of implementation and for interoperability with both SGML and HTML and customizes SGML in a number of significant ways. First, a specific choice of syntax characters was made by the specification designers so that everyone using XML will use the same well-defined syntax. For example, all start tags used to identify elements of an XML file must begin with "<" and end with ">". Second, a new "empty-element" tag may be used to indicate that this is an empty element and that an end tag is not expected. This new empty-element tag is like a start tag with a slash character just before the closing greater-than angle bracket, i.e., "/>". Third, tag omission is not allowed as it is in SGML, so that each non-empty element will have both a start tag and an end tag. XML was developed by the SGML Editorial Board formed under the auspices of the World Wide Web Consortium (W3C) beginning in 1996 and has been reviewed and approved by the members of the W3C, and is therefore deemed "stable" and ready for widespread deployment. The XML specification can be found on the Internet at the website for the W3C (i.e. w3.org).

CSS is a style sheet language that can be applied to HTML to control the style of a document, e.g., by indicating the fonts and colors to use, how much white space to insert, etc. Authors can attach styles to their HTML documents, while readers may have their own personal style sheets. Typically, the styles are placed in the HEAD of an HTML document, although they can also be placed in the BODY and often are placed in a separate file linked to the HTML document via hypertext. The basic format of the STYLE tag is:

<STYLE TYPE="text/css">

HTML tag.class {special formatting}</STYLE>

Further details regarding CSS may be found at the World Wide Web Consortium (W3C) web site.

Scalable Vector Graphics (SVG) is a language for describing two-dimensional graphics in XML. SVG allows for three types of graphic objects: vector graphic shapes (e.g., paths consisting of straight lines and curves), images, and text. Graphical objects can be grouped, styled, transformed, and composited into previously rendered objects. The feature set includes nested transformations, clipping paths, alpha masks, filter effects, template objects, and extensibility. Because of its compatibility and leveraging of other Web standards, features like scripting can be done on HTML and SVG elements simultaneously within the same Web page. More information and the specification for SVG may be found on the Internet at the World Wide Web Consortium web site.

The present invention makes use of HTML, XML, CSS, and SVG. In brief, when a portion of a spreadsheet is to be saved (or inserted) from EXCEL 2000 as or part of an HTML document, any EXCEL 2000 unique Conditional Formatting information will be written into XML and inserted in the <HEAD> tag of the HTML. This formatting information is ignored by a browser used to display the HTML document, but is available for use by EXCEL 2000 if the inserted data in the HTML document is reintroduced into EXCEL 2000. A critical element of the present invention is a new CSS property referred to as MSO-Ignore. The MSO-Ignore property is included in the newly written HTML introduced from an application such as EXCEL 2000 if the any of the HTML or CSS formatting information included in the newly written HTML (formatting information required for the proper display of the data when displayed in a browser) is either inconsistent with the Conditional Formatting information stored in the <HEAD> tag, or if the HTML formatting information conflicts with any source application formatting functions (such as Number Formatting, "spilled text," and shape or image data requiring different formatting for proper display in HTML as compared to the source application). Thus, if EXCEL 2000 parented data in that HTML document must be reintroduced into EXCEL 2000, the HTML formatting data identified by the MSO-Ignore property is "ignored" by EXCEL 2000, and the persisted EXCEL 2000 formatting data are used to recreate the original formatting and functionality of the data in the spreadsheet.

As previously discussed, an EXCEL 97 user may have used Conditional Formatting to cause the data in a cell to be displayed in a red font when the data meets some defined criteria, such as having a negative value. Because HTML does not support the functionality of displaying data in a cell with a red font only when the data meets some user-defined criteria, when values in EXCEL 97 data having this functionality are translated into HTML, the resulting HTML formatting will indicate that the cell data should always be displayed using a red font. Under the prior art, when HTML data are translated back into EXCEL 97, the Conditional Formatting will not be retained, and the cell data will be displayed with a red font, regardless of whether the cell data meets the defined criteria, or was previously made red by the user for arbitrary reasons. MSO-Ignore solves this problem by enabling EXCEL 2000 to differentiate between EXCEL 2000 parented data in an HTML document that should be displayed in EXCEL 2000 as a red font all the time and EXCEL 2000 parented data in an HTML document that should be displayed in EXCEL 2000 as a red font only if certain criteria are met. When an HTML document contains EXCEL 2000 parented data that should be displayed in EXCEL 2000 as a red font only if certain criteria are met, the MSO-Ignore property instructs EXCEL 2000 to "ignore" the HTML formatting information that indicates the cell data should be displayed as red all the time. The following two exemplary HTML snippets should clarify these points.

EXAMPLE 1

If an EXCEL 2000 user has defined the font color to be red and the background to be blue in one or more cells at all times by using a direct formatting command, then a CSS class containing the formatting information would be created, and that class would be referenced within the table. The resulting HTML data would be:

1. <HTML>
2. <HEAD>
3. <style>
4. xl1 {color: red; background: blue;}
5. </style>
6. <BODY>
7. <table>
8. <tr>
9. <td class=xl1>
10. cell is red with blue background
11. </td>
12. </tr>
13. </table>
14. </BODY>
15. </HTML>

EXAMPLE 2

If an EXCEL 2000 user has defined the font color to be red and the background to be blue in any cell only at times when the cell data meet certain criteria, by using conditional formatting, the resulting HTML data would be:

1. <HTML>
2. <BODY>
3. <table>
4. <tr>
5. <td style="color: red; background: blue; mso-ignore: style:">
6. cell is red with blue background
7. </td>
8. </tr>
9. </table>
10. </BODY>
11. </HTML>

The formatting in the style attribute is due to the Conditional Formatting. When these HTML data are translated back into EXCEL 2000, "mso-ignore" and its value "style" are recognized and indicate to EXCEL 2000 that everything inside of the style attribute should be ignored. EXCEL 2000 will then use the Conditional Formatting information stored as XML in the <HEAD> tag of the HTML data to recreate the original Conditional Formatting parameters.

The MSO-Ignore feature is used to incorporate EXCEL 2000 specific formatting data into HTML data. This information is then available to EXCEL 2000 when translating the HTML data back into EXCEL 2000 format and is written using CSS. Thus, MSO-Ignore is used when exporting data from an EXCEL 2000 file into an HTML file, and also when the data imported into the HTML file are loaded back into EXCEL 2000, within a spreadsheet.

The steps employed by the present invention for exporting EXCEL 2000 data into an HTML file using MSO-Ignore are shown in a flow chart 10 in FIG. 1. In flow chart 10, it is assumed that an EXCEL 2000 workbook having one or more spreadsheets is open and that the user is saving data (a data table) from a spreadsheet as HTML, i.e., translating the data for insertion into an HTML document. To export the data from EXCEL 2000, it is first necessary to write the header for the HTML, as shown in a block 12. The next step in the logical process is implemented as shown in a block 14, in which any Conditional Formatting is preserved by writing the Conditional Formatting into XML. This XML is preferably incorporated into the <HEAD> section of the HTML being written. At the same time, the logic also looks for any Number Formatting in the EXCEL 2000 data. Any Number Formatting will be written into the HTML document as CSS properties in the step of block 14, and preferably incorporated into the <HEAD> section of the HTML being written, as well. The logic then proceeds to a block 16 in which EXCEL 2000 begins writing the table data into HTML.

The logic proceeds to a decision block 18 in which it determines if the instant location in the data table represents the beginning of a group of contiguous empty cells. If this condition exists, the logic determines the number of contiguous empty cells present, and whether the empty cells are arranged as rows and/or columns. If yes, the logic then proceeds to a block 20. In block 20, the logic uses the HTML attributes "colspan" to abbreviate the HTML required to represent the group of contiguous empty cells in a "shorthand" approach that reduces the amount of HTML required to represent all of the empty cells.

Spreadsheet data often includes significant numbers of empty cells. If each individual empty cell were written into HTML in a conventional manner, the resulting HTML document becomes quite large in size. Keeping the HTML document file size as small as possible is important to improve both browser performance and reduce storage requirements. A single empty row with 10 cells or columns would conventionally be represented in basic HTML as shown in the following Example 3.

EXAMPLE 3

1. <HTML>
2. <BODY>
3. <table>
4. <tr>
5. <td>
6. </td>
7. <td>
8. </td>
9. <td>
10. </td>
11. <td>
12. </td>
13. <td>
14. </td>
15. <td>
16. </td>
17. <td>
18. </td>
19. <td>
20. </td>
21. <td>
22. </td>
23. <td>
24. </td >
25. </tr>
26. </table>
27. </BODY>
28. </HTML>

Using the "colspan" attribute in accord with the present invention, the HTML code required is reduced to that shown in the following Example 4.

EXAMPLE 4

1. <HTM L>
2. <BODY>
3. <table>
4. <tr>
5. <td colspan=10 style="mso-ignore: colspan">
6. </td>
7 </tr>
8 </table>
9. </BODY>
10. </HTML>

If the MSO-Ignore property were not included, when the EXCEL 2000 parented data in an HTML document with the "colspan" attribute were reintroduced into an EXCEL 2000 spreadsheet, the group of 10 empty cells or columns in the above example would be merged into a single empty cell, thereby greatly changing the format or layout of the data table as it appears in the spreadsheet. The inclusion of the MSO-Ignore property enables EXCEL 2000 to abbreviate the HTML code required to represent groups of empty cells, while ensuring that the proper EXCEL 2000 formatting is persisted when the HTML is reintroduced into an EXCEL 2000 spreadsheet. With large data files containing multiple empty rows, this abbreviated form can greatly improve performance and reduce storage overhead.

The "rowspan" attribute operates in a similar manner, but for a group of contiguous cells oriented in rows, not columns. Currently EXCEL 2000 supports the use of MSO-Ignore in conjunction with "colspan" or "colspan-rowspan", but not with "rowspan" alone. MSO-Ignore is used with "colspan" as described above. MSO-Ignore is used with "colspan-rowspan" to "ignore" the number of cells for a rectangular area defined by the "colspan" and "rowspan" HTML attributes. The "colspan-rowspan" attribute is generally used in conjunction with shape and image data. As will be described in detail later, the "colspan-rowspan" attribute is sometimes required to ensure that EXCEL 2000 shape data is properly displayed in a browser when translated into HTML. The use of MSO-Ignore in association with the "colspan-rowspan" attribute ensures that when loaded into EXCEL 2000, the HTML shape data are properly displayed in EXCEL 2000. While it is entirely possible to use MSO-Ignore in association with the "rowspan" attribute alone, this function is not implemented in EXCEL 2000, since it is expected to be of less utility than the "colspan" or "colspan-rowspan" attribute.

Once the logic has completed translating the group of contiguous empty cells into HTML at block 20, the logic proceeds to a block 21 and accesses the next cell in the data table. The logic then proceeds with a decision block 22 to determine if the current cell contains any EXCEL 2000 formatting, which could cause a formatting conflict when translated into HTML, and then reintroduced into an EXCEL 2000 spreadsheet. Note that if no contiguous empty cells are found in decision block 18, the logic also proceeds to decision block 22.

There are several types of EXCEL 2000 specific formatting that require special attention when translating spreadsheet data into HTML to ensure that if the data in the HTML format is reintroduced into an EXCEL 2000 spreadsheet, the formatting and functionality originally associated with the data in EXCEL 2000 is persisted. The use of the MSO-Ignore feature in conjunction with the "colspan" attribute to abbreviate the HTML code for multiple empty cells is one example. Other EXCEL 2000 specific formatting that requires the MSO-Ignore property to be added to the HTML formatting information to ensure that the original EXCEL 2000 formatting is persisted are "spilled text," user-defined Conditional Formatting, Number Formatting, shapes or images, and certain table headings that may require padding to be added for easier readability in HTML.

If at decision block 22 the logic determines that the instant cell contains EXCEL 2000 specific formatting that requires the use of the MSO-Ignore property to persist the EXCEL 2000 specific formatting, the logic proceeds to a block 24, in which the cell formatting is translated to HTML. In block 24, the logic determines the type of EXCEL 2000 specific formatting applicable to that particular cell and translates that formatting into HTML using style attributes and the MSO-Ignore property. It is important to understand that the inclusion of the MSO-Ignore property is not to control how the HTML document is displayed by a browser, but rather to enable EXCEL 2000 to discard the HTML and CSS formatting information required for proper display by a browser in favor of persisted EXCEL 2000 formatting information (which in the case of Conditional Formatting is written into XML and included in the header of the HTML document) that will allow the formatting and functionality of the data to be retained if the data are returned to the spreadsheet. If the MSO-Ignore property were not used, a usable HTML document would be created. However, EXCEL 2000 parented data from such an HTML document would not be able to be reintroduced into an EXCEL 2000 spreadsheet with the original EXCEL 2000 formatting and functionality of that data intact. Example 2 above shows how the MSO-Ignore property is included in the HTML.

One type of EXCEL 2000 specific formatting that will trigger the logic path from decision block 22 to block 24 (including MSO-Ignore in the HTML) is "spilled text." In EXCEL 2000, text can be spilled from one cell into what appears to be the next one or more cells (so a longer line of text may be included) without causing the first cell to merge with the adjacent cells. HTML does not support this functionality, and when translated into HTML, such "spilled text" will result in merged cells in the HTML document. The HTML formatting attribute used to merge cells is "colspan." If the EXCEL 2000 data included cells that were truly merged and not spilled text, the resulting HTML would be:

1. <HTML>
2. <BODY>
3. <table>
4. <tr>
5. <td colspan=3>
6. these three cells are really merged
7. </td>
8. </tr>
9. </table>
10. </BODY>
11. </HTML>

Under the prior art, "spilled text" is translated into HTML in the above fashion, as if merged cells. Thus, when such data in the HTML document is translated back into EXCEL 2000, the "spilled text" functionality is lost. In accord with the present invention, including the MSO-Ignore property along with the HTML formatting information allows the HTML document to display the entire text (as merged cells), while providing EXCEL 2000 a mechanism to "ignore" the HTML formatting so that when the EXCEL 2000 parented HTML data are reintroduced into an EXCEL 2000 spreadsheet, the spilled text format again appears. The resulting HTML, including the MSO-Ignore property, is:

1. <HTML>
2. <BODY>
3. <table>
4. <tr>
5. <td colspan=3 style"mso-ignore: colspan" >
6. this text spills across three cells
7 </td >
8 </tr>.
9 </table>
10. </BODY>
11. </HTML>

Another EXCEL 2000 formatting command that can trigger the logic path from decision block 22 to block 24 so as to require the use of MSO-Ignore is Number Formatting. This EXCEL 2000 feature can be used in several ways, such as allowing a user to express the data value 3 in a plurality of formats, such as $3.00, 3.0, or 3.00. EXCEL 2000 preferably persists Number Formatting information using CSS. One use of Number Formatting is to display positive values as one color (typically black) and negative values as a second color, typically red. This latter use requires the MSO-Ignore property to be added so that EXCEL 2000 can differentiate between HTML data that is one color because the corresponding EXCEL 2000 data used Number Formatting properties to cause the cell data to be displayed as a certain color, from HTML data that is also that color because the user chose to define the data in the cell(s) to that color at all times (generally as was described with respect to Conditional Formatting). Upon loading the HTML data into an EXCEL 2000 spreadsheet, the persisted formatting information included in the CSS is used to recreate the data's original EXCEL 2000 formatting.

It is also envisioned that the logic will determine in block 12 whether a cell requires additional padding to be properly displayed when viewed as part of an HTML document. In EXCEL 2000, the user can determine whether the data displayed in a cell is justified, centered, aligned left or aligned right. Often in HTML documents, if such data are displayed aligned left or right, text data appear too close to a border of the cells and are difficult to read. To aid in the readability of such data, EXCEL 2000 preferably includes padding for the HTML formatting when writing out the CSS information in the document header. Such padding added into HTML is associated with the MSO-Ignore property and will be "ignored" by EXCEL 2000 if the data are reintroduced into an EXCEL 2000 spreadsheet.

A final example of EXCEL 2000 specific formatting that may be persisted using the MSO-Ignore property in block 24 is the formatting of shape or image data. Such EXCEL 2000 data frequently have specific formatting that conflicts with the HTML formatting required to display an image or shape properly in an HTML document with a browser. To ensure that such data can be reintroduced into EXCEL 2000 with the original formatting and functionality intact, when such data are translated into HTML, the MSO-Ignore property is used. The potential formatting conflicts include, but are not limited to, the need for HTML to use "colspan" and "colspan-rowspan" to properly recreate an image for display in a browser. The HTML formatting commands for "colspan" and "colspan-rowspan" need to be "ignored" when loading EXCEL 2000 parented data back into an EXCEL 2000 spreadsheet for the shape or image data to be properly displayed in EXCEL 2000. If the "colspan" and "colspan-rowspan" formatting commands were included in the data being reintroduced into EXCEL 2000, cells that were originally not merged (as in the "spilled text" discussed above) in the original EXCEL 2000 data would be merged, and the image would not be displayed properly when reintroduced to EXCEL 2000.

It should be noted that when EXCEL 2000 translates image or shape data into HTML, the image data are "coded" to be compatible with both old and new browsers. The current preferred method of incorporating images or shapes into HTML is to use SVG. This is a relatively new language, and older browsers are not compatible with the SVG language. Therefore, the image and shape data from EXCEL 2000 are translated into HTML both using SVG and the older "inline" HTML format, so that the resulting HTML data are compatible with both old and new browsers. EXCEL 2000 will use either a VG LAYOUT format or a VG LAYOUT 2 format depending on the type of data. The MSO-Ignore feature enables such EXCEL 2000 data to be properly displayed within an HTML document, and still be able to be reintroduceable into an EXCEL 2000 spreadsheet, with all the EXCEL 2000 specific formatting intact.

EXCEL 2000 uses the MSO-Ignore feature with VG LAYOUT and VG LAYOUT 2 to indicate the portions of the HTML document that are to be used by EXCEL 2000 when the document is reintroduced back into EXCEL 2000. More specifically it indicates blocks of HTML tags and attributes that should be ignored, since they represent HTML formatting needed only for browsers that don't support SVG. These blocks of HTML tags and attributes contain nested TABLE tags and pointers to image data not needed by EXCEL 2000 during reintroduction of the HTML document. VG LAYOUT and VG LAYOUT 2 are used in different scenarios depending on the type of image or shape data being written, since different types of image or shape data require different HTML tags for browsers that don't support SVG. Since EXCEL 2000 understands SVG, the MSO-Ignore feature combined with VG LAYOUT and VG LAYOUT 2 allow it to correctly ignore HTML and formatting written specifically for the browser.

Once the cell data have been translated into HTML at block 24, the logic proceeds to a decision block 26, where the logic determines if any more cells remain to be processed. If so, the logic returns to block 18 in which the logic looks for contiguous empty cells as described above. If at decision block 26, the logic determines that the last cell of a selected portion of the spreadsheet has been processed, this procedure for saving at least a portion of an EXCEL 2000 spreadsheet data as HTML is complete.

It is expected that after a user has transferred data from an EXCEL 2000 spreadsheet into the HTML format, at some point, the user may wish to reintroduce that data back into an EXCEL 2000 spreadsheet. The steps for loading the EXCEL 2000 data that were saved in the HTML format back into an EXCEL 2000 spreadsheet are shown in a flow chart 11, in FIG. 2. Once a user selects an HTML document from which to load the data back into the EXCEL 2000 spreadsheet, the logic proceeds to a block 28 and the HTML document is opened. The logic proceeds to a block 30 in which EXCEL 2000 loads the XML portion of the HTML document and looks for any Conditional Formatting information that is written in XML and included in the <HEAD> tag of the HTML document. If any Conditional Formatting information is found, EXCEL 2000 will load that Conditional Formatting (the formatting will be applied to the data after the data are loaded). In block 30, the logic also applies any CSS properties that are incorporated or referenced by the HTML document representing the portion to be moved back into the spreadsheet, such as those associated with Number Formatting. The logic then proceeds to a block 32, where the table data from the HTML document are loaded into EXCEL 2000. Once the desired HTML data has been loaded into EXCEL 2000, the logic proceeds to a block 34, where the cells are iterated until the end of the data table is reached. If all the cells have been iterated, the process is completed, but if not, the logic proceeds to a decision block 36, which determines if the HTML cell data includes the MSO-Ignore property. If not, the logic returns to block 34 and continues to iterate the cells.

If the HTML cell data includes MSO-Ignore, then the logic proceeds to a block 38, in which the logic determines if image shape data are present. If so, the logic uses the image shape data to recreate the image in EXCEL 2000. The EXCEL 2000 shape or image data are persisted as XML inside the HTML file. The logic then proceeds to a decision block 40 and determines if VG LAYOUT or VG LAYOUT 2 formatting is present. As mentioned earlier, VG LAYOUT and VG LAYOUT 2 are shape or image formatting written in SVG. Making an image or shape display in HTML the same way it is displayed in EXCEL 2000 requires changing the original EXCEL 2000 specific formatting to a different HTML formatting (often involving the HTML attributes "colspan" and "colspan-rowspan"). This task requires the use of the MSO-Ignore property to ensure that the original EXCEL 2000 formatting is persisted. If in decision block 40, the logic determines that either VG LAYOUT or VG LAYOUT 2 formatting is present, the logic proceeds to a block 42. In block 42, the logic ignores the HTML formatting written to ensure the image or shape is properly displayed in a browser. The HTML formatting relating to VG LAYOUT or VG LAYOUT 2 formatting is ignored until the end of the VG LAYOUT block. The logic then returns to block 34 and the next cell is iterated. Note that if VG LAYOUT or VG LAYOUT 2 formatting is found in decision block 40, EXCEL 2000 will use the image shape data persisted from the original EXCEL 2000 data to recreate the image (as described with reference to block 38).

If in decision block 40 the cell does not contain VG LAYOUT or VG LAYOUT 2 formatting data, the logic proceeds to a decision block 44 and checks for "colspan" or "colspan-rowspan" attributes. Note that while the HTML formatting relating to the VG LAYOUT or VG LAYOUT 2 formatting may include "colspan" or "colspan-rowspan", the "colspan" or "colspan-rowspan" attributes the logic is looking for in decision block 44 will have arisen from "spilled text" or empty cells in the original EXCEL 2000 data.

If no "colspan" or "colspan-rowspan" attributes are encountered in decision block 44, the logic proceeds to a block 46, discards the HTML attributes and properties specified by the tag, and returns to block 34 to process the next cell. If at decision block 44, "colspan" or "colspan-rowspan" attributes are encountered, the logic proceeds to a block 48 and ensures that the cells are not merged by skipping the number of cells defined by the "colspan" or "colspan-rowspan" formatting information in the HTML data. The logic then returns to block 34 and the process is repeated until all the cells have been processed.

At this point, it may be helpful to analyze how the original EXCEL 2000 data are persisted in an HTML document with respect to the numerous formatting conflicts that may exist between EXCEL 2000 and HTML. If the original EXCEL 2000 data includes Conditional Formatting, that information is written out in the <HEAD> tag of the HTML data, at block 14 of FIG. 1. When the HTML data are reintroduced into EXCEL 2000, the persisted formatting information is retrieved from the <HEAD> tag of the HTML and used to recreate the original EXCEL 2000 formatting parameters at block 30 in FIG. 2.

If the formatting conflict between HTML and the original EXCEL 2000 data are due to the inclusion of the "colspan" or "colspan-rowspan" attribute (along with MSO-Ignore in block 20 of FIG. 1) to reduce the size of required HTML document, the original EXCEL 2000 formatting is persisted by "ignoring" the "colspan" or "colspan-rowspan" attribute in block 48 of FIG. 2 when the EXCEL 2000 parented HTML data are reintroduced into the EXCEL 2000 spreadsheet. When the formatting conflict between HTML and the original EXCEL 2000 data arises due to "spilled text," the original EXCEL 2000 formatting is persisted by first incorporating the "colspan" attribute with the MSO-Ignore property into the HTML data at block 22 of FIG. 1 (to ensure that the HTML data displays properly in a browser), and then by similarly "ignoring" the "colspan" attribute in block 48 of FIG. 2, when the HTML data are reintroduced into the EXCEL 2000 spreadsheet.

When the type of Number Formatting applied by an EXCEL 2000 user (e.g. the user can specify one color for positive cell data, another color for negative cell data) conflicts with the HTML formatting required to properly display the data in a browser, the original EXCEL 2000 formatting is persisted by first creating a CSS representing the original EXCEL 2000 Number Formatting. Preferably the CSS is written into the <HEAD> tag of the HTML created translating the original EXCEL 2000 Number Formatting into HTML. The CSS representing the original EXCEL 2000 Number Formatting may also be written into the <BODY> of the HTML, or saved as a separate HTML document linked to the HTML being created. The creation of the CSS representing the original EXCEL 2000 Number Formatting takes place in block 14 in FIG. 1. In block 24 of FIG. 1, the new HTML is written, including the MSO-Ignore property, to format the color of the cell data to match the color in which the cell data are currently displayed in EXCEL 2000. When the HTML data are reintroduced into EXCEL 2000, the CSS representing the original EXCEL 2000 Number Formatting is loaded into EXCEL 2000 in block 30 of FIG. 2. In block 46 of FIG. 2 the logic "ignores" the HTML attributes describing the Number Formatting and instead uses the formatting information present in the CSS. It should be noted that this is just one example of how Number Formatting can change the appearance of a cell.

If the original EXCEL 2000 data includes shape or image data, that formatting information is persisted by first writing the HTML formatting information required to properly display the image in a browser using the MSO-Ignore property in association with any formatting change at block 22 of FIG. 1. An example of a formatting change that might be required to ensure that an image translated from EXCEL 2000 into HTML displays properly in a browser is the use of the "colspan" and "colspan-rowspan" attributes in the HTML, which are not needed in the spreadsheet format. When the HTML data are reintroduced into EXCEL 2000, the formatting changes required for proper display in a browser are "ignored" in block 48 of FIG. 2.

EXCEL 2000 shape information is persisted as XML inside the table in the cell where the shape is anchored. For proper display in a browser, the shape data as translated into HTML can incorporate VG LAYOUT, VG LAYOUT 2, or colspan-rowspan properties. When the shape data are translated into HTML, MSO-Ignore is associated with these properties. Thus, when the HTML shape data are loaded into EXCEL 2000, these properties (required for proper display of the shape in a browser, but not compatible with EXCEL 2000) can be ignored. The EXCEL 2000 formatting persisted in the XML (which is also part of the HTML shape data) ensures that the shape is properly displayed in EXCEL 2000. If VG LAYOUT is part of the HTML shape date, on load, EXCEL 2000 ignores all data (usually a nested table) inside the SPAN tag. If the HTML shape data include VG LAYOUT 2, the contents of the SPAN tag is usually a nested table with a single cell, and upon load, EXCEL 2000 will apply the contents and formatting of that cell to the parent cell of the nested table. If colspan-rowspan is part of the HTML shape data, upon load EXCEL 2000 will not merge the cells (as described above).

Exemplary Operating Environment

FIG. 3 and the following discussion are intended to provide a brief, general description of a suitable computing environment in which the invention may be implemented. As discussed above, a preferred embodiment of the MSO-Ignore is implemented as part of a spreadsheet program (EXCEL 2000, WORD 2000, etc.) that is executed by a personal computer or workstation. The application program comprises a plurality of program modules that include routines, programs, objects, components, data structures, etc. which perform particular tasks or implement particular abstract data types. Moreover, those skilled in the art will appreciate that the invention may be practiced with other computer system configurations, including hand-held devices, multiprocessor systems, microprocessor based or programmable consumer electronics, network personal computers, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 3, an exemplary system for implementing the invention includes a general purpose computing device in the form of a conventional personal computer 120, including a processing unit 121, a system memory 122, and a system bus 123 that couples various system components including the system memory to processing unit 121. System bus 123 may be any of several types of bus structures including a memory bus or memory controller, a peripheral bus, and a local bus using any of a variety of bus architectures. The system memory includes a read only memory (ROM) 124 and a random access memory (RAM) 125. A basic input/output system (BIOS) 126, containing the basic routines that helps to transfer information between elements within personal computer 120, such as during start-up, is stored in ROM 124. Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively. The drives and their associated computer readable media provide nonvolatile storage of computer readable instructions, data structures, program modules, and other data for personal computer 120. Although the exemplary environment described herein employs hard disk 127, a removable magnetic disk 129, and a removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment.

A number of program modules may be stored on hard disk 127, magnetic disk 129, optical disk 131, ROM 124, or RAM 125, including an operating system 135, one or more application programs 136, other program modules 137, and program data 138. A user may enter commands and information into personal computer 120 through input devices such as a keyboard 140 and a pointing device 142. Other input devices (not shown) may include a microphone, joystick, game pad, satellite dish, scanner, or the like. These and other input devices are often connected to processing unit 121 through a serial port interface 146 that is coupled to the system bus, but may be connected by other interfaces, such as a parallel port, game port, or a universal serial bus (USB). A monitor 147 or other type of display device is also connected to system bus 123 via an interface, such as a video adapter 148. In addition to the monitor, personal computers typically include other peripheral output devices (not shown), such as speakers and printers.

Personal computer 120 may operate in a networked environment using logical connections to one or more remote computers, such as a remote computer 149. Remote computer 149 may be another personal computer, a server, a router, a network PC, a peer device, or other common network node, and typically includes many or all of the elements described above relative to personal computer 120, although only a memory storage device 150 has been illustrated in FIG. 3. The logical connections depicted in FIG. 3 include a local area network (LAN) 151 and a wide area network (WAN) 152. Such networking environments are commonplace in offices, enterprise wide computer networks, intranets, and the Internet.

When used in a LAN networking environment, personal computer 120 is connected to local network 151 through a network interface or adapter 153. When used in a WAN networking environment, personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device. It will be appreciated that the network connections shown are exemplary and other means of establishing a communications link between the computers may be used.

Although the present invention has been described in connection with a preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for translating data having a format and functionality specific to a parent application into a different application format, such that any formatting changes required to translate the data into the different application format are reversible, enabling the data to be reintroduced into the parent application without loss of the format and functionality that the data previously exhibited in the parent application, the method comprising the steps of:
   (a) enabling a user to select the data to be translated, from within the parent application;
   (b) translating the data from the parent application format into the different application format, and including within the translated data a marker associated with each formatting change required to resolve any conflicts between a first format and first functionality available in the parent application and a second format and second functionality available in the different application;
   (c) incorporating the data translated into the different application format within a file of the different application; and
   (d) enabling a user to reintroduce the data that were translated into the parent application, such that wherever a marker denoting a formatting change is found in said data, that formatting change is ignored by the parent application, and the first format and first functionality is reapplied to the data reintroduced into the parent application.

2. The method of claim 1, wherein the step of incorporating the data that were translated into the file of the different application comprises the step of including within that file the first format and first functionality information, such that said first format and first functionality information is ignored by the different application, and the step of enabling a user to reintroduce the data into the parent application comprises the step of using said first format and first functionality information to recreate the original formatting of the data.

3. The method of claim 1, wherein the parent application comprises a spreadsheet program and the data that are translated are selected from a spreadsheet and include one of a data table and a chart.

4. The method of claim 3, wherein the different application format includes components of HTML, and wherein the step of translating the data further includes the steps of:
   (a) identifying any contiguous empty cells in the data selected from the spreadsheet; and
   (b) abbreviating the HTML required to define the empty cells by using a colspan attribute.

5. The method of claim 4, wherein the step of abbreviating the HTML required to define the empty cells further comprises using a colspan-rowspan attribute.

6. The method of claim 1, wherein the different application format includes components of hypertext markup language (HTML).

7. The method of claim 6, wherein any formatting changes are made using at least one of the group including HTML tags, attributes, and cascading style sheet properties.

8. The method of claim 6, wherein the formatting change comprises adding padding so that the data are more aesthetically displayed in a browser.

9. The method of claim 6, wherein the conflict between the format and functionality originally associated with the data in the parent application and the format and functionality available in the different application arises due to spilled text, and the formatting change comprises using a colspan attribute.

10. The method of claim 6, wherein the conflict between the format and functionality originally associated with the data in the parent application and the format and functionality available in the different application arises due to a formatting command in the parent application that is specific to a function of the data, further comprising the steps of:
   (a) including said formatting command within the data being translated into the different application format in the step of translating the data, but in a form such that the formatting command is ignored by the different application; and
   (b) using the formatting command in the data translated, to recreate the original formatting of the data, if the data are reintroduced into the parent application.

11. The method of claim 10, wherein the formatting command is defined by a user of the parent application.

12. The method of claim 10, wherein the formatting command changes the appearance of the data in the parent application when the data change between negative and positive values.

13. The method of claim 6, wherein the conflict between the format and functionality originally associated with the data in the parent application and the format and functionality available in the different application arises due to data that include one of a shape and an image.

14. The method of claim 1, wherein the marker associated with any formatting change comprises a cascading style sheet property.

15. The method of claim 14, wherein the cascading style sheet property comprising the marker is an MSO-Ignore property.

16. A method of persisting formatting information so that data having a first format and a functionality in a parent application specific to the first format are translatable into a second format, different from the first format, and of enabling the data to be returned from the second format to the parent application without loss of the functionality specific to the first format, comprising the steps of:

(a) enabling a user of the parent application to select the data in the first format to be translated into the second format;

(b) translating the data from the first format into the second format, producing translated data that are usable in another application;

(c) including within the translated data a marker associated with each formatting change arising from the translation of the data from the first format to the second format;

(d) incorporating the translated data into a file and including within that file format and functionality information associated with the data in the first format, but in a form such that the format and functionality information is ignored by any application that uses the file with the translated data in the second format; and (e) enabling the translated data in the file to be returned into the first format, such that wherever a marker denoting an associated formatting change is found in the translated data, the associated formatting change is discarded, the format and functionality information included with the translated data in the file being used to recreate the first format and restore the functionality that the data originally exhibited in the first format.

17. The method of claim 16, wherein the first format is associated with a spreadsheet program and the data that are translated include one of a data table and a chart selected from a spreadsheet.

18. The method of claim 17, wherein the second format is compatible with hypertext markup language (HTML).

19. The method of claim 18, wherein the marker comprises a cascading style sheet property.

20. The method of claim 18, wherein the format and functionality information associated with the data in the first format is included within a <HEAD> section of an HTML document including the translated data.

21. The method of claim 18, wherein the format and functionality information associated with the data in the first format is included within a <BODY> section of an HTML document including the translated data.

22. The method of claim 18, wherein the format and functionality information associated with the data in the first format is at least in part written as a cascading style sheet.

23. The method of claim 18, wherein the formatting changes are necessary because the data in the first format includes one of spilled text, formatting that is a function of the data in the first format, a shape, and an image.

24. A method for minimizing the size of a hypertext markup language (HTML) file that is generated at least in part by translating data from a file format used by a parent application into an HTML file format, while ensuring that the data translated and included in the HTML file can be reintroduced into the parent application with the same format and functionality that the data originally exhibited in the parent application, comprising the steps of:

(a) using the parent application, enabling a user to select the data to be translated into the HTML file format;

(b) parsing the data selected to find any contiguous empty cells;

(c) translating the data from the file format used in the parent application into the HTML file format, using a colspan attribute to abbreviate the HTML required to define any contiguous empty cells;

(d) including a marker that is associated with each colspan attribute thus used;

(e) incorporating the data translated into the HTML file format within an HTML file; and (f) ignoring the colspan attributes associated with the marker if reintroducing the data into the parent application from the HTML file.

25. The method of claim 24, wherein the HTML file is created by the step of translating the data from the file format of the parent application into the HTML file format.

26. The method of claim 24, wherein the HTML file is an existing HTML file to which the data are added after the step of translating.

27. The method of claim 24, wherein the step of translating the data further comprises the steps of:

(a) using a rowspan attribute to abbreviate the HTML required to define any contiguous empty cells;

(b) including a marker associated with each rowspan attribute thus used; and (c) ignoring the rowspan attributes associated with the marker if reintroducing the data into the parent application from the HTML file.

28. The method of claim 24, wherein the marker comprises a cascading style sheet property.

29. The method of claim 28, wherein the cascading style sheet property is an MSO-Ignore property.

30. A method for translating data in a file format used by a parent application into a hypertext markup language (HTML) format such that an aesthetic appearance of translated data as viewed with a browser is improved, while ensuring that the translated data in the HTML format can be reintroduced into the parent application without losing the format and functionality that the data originally had in the parent application, comprising the steps of:

(a) using the parent application, enabling a user to select the data to be translated into HTML;

(b) analyzing the data to identify regions where padding can be inserted to improve the aesthetic appearance of the data when viewed with a browser;

(c) translating the data from the file format of the parent application into the HTML format and incorporating padding for said regions;

(d) including a marker associated with any padding added;

(e) incorporating the data translated into an HTML file; and (f) ignoring any padding associated with the marker if reintroducing the data translated from within the HTML file, into the parent application.

31. The method of claim 30, wherein the parent application comprises a spreadsheet program and the data that are translated include one of a data table and a chart selected from a spreadsheet.

32. The method of claim 30, wherein the HTML file is created by the step of translating the data from the format of the parent application into the HTML format.

33. The method of claim 30, wherein the HTML file is an existing HTML file to which the data translated are added.

34. The method of claim 30, wherein the marker comprises a cascading style sheet property.

35. The method of claim 34, wherein the cascading style sheet property is an MSO-Ignore property.

36. The method of claim 30, wherein the padding is added to a region that includes text that would otherwise be displayed in the browser so close to a border of an adjacent region as to interfere with a readability of the text.

37. An article of manufacture adapted for use with a computer, comprising:
(a) a memory medium; and
(b) a plurality of machine instructions comprising a computer program, which are stored on the memory medium, said plurality of machine instructions when executed by a computer, causing the computer to:
(i) enable a user to specify a data selection to be translated from a first file format of a parent application into a second file format, different from the first file format, for use by another application;
(ii) translate the data selection into the second file format, including within the data translated a marker associated with each formatting change required to resolve any conflicts between the first file format and a functionality associated with the data in the parent application, and the second file format and its corresponding functionality in the other application;
(iii) incorporate the data translated into a file using the second file format; and
(iv) enable the data translated to be reintroduce from the file into the parent application such that whenever any marker denoting a format change is found, that formatting change is ignored by the parent application.

38. The article of manufacture of claim 37, wherein the machine instructions which cause the computer to incorporate the data translated further cause the computer to include information defining and preserving the first file format and functionality of the data, such that the information is ignored by the other application compatible with the second file format, said information being used by the computer to recreate the original formatting and functionality of the data if reintroduced into the parent application.

39. The article of manufacture of claim 38, wherein the parent application comprises a spreadsheet program and the data that are translated include one of a data table and a chart selected from a spreadsheet.

40. The article of manufacture of claim 38, wherein the second file format is written in hypertext markup language.

41. The article of manufacture of claim 38, wherein the data translated are incorporated into an existing file.

42. The article of manufacture of claim 38, wherein the marker comprises a cascading style sheet property.

43. The article of manufacture of claim 42, wherein the cascading style sheet property is an MSO-Ignore property.

44. A system for enabling formatting and functionality information to be persisted when data having a first format used by a parent application are translated into a second format, different from the first format, required of another application, such that the data translated can be returned to the parent application without loss of any format and any functionality that the data had in the first format, comprising:
(a) a memory in which a plurality of machine instructions defining the parent application are stored;
(b) a display; and
(c) a processor that is coupled to the memory to access the machine instructions and to the display, said processor executing said machine instructions and thereby implementing a plurality of functions, as follows:
(i) enabling a user within the parent application to specify the data in the first format to be translated into the second format;
(ii) translating the data selection into the second format, including within the data translated, a marker associated with each formatting change required to resolve any conflicts between a format and a functionality associated with the data in the first format and a format and a functionality available in the second format;
(iii) incorporating the translated data into a file compatible with the second format and including within the file, format and functionality information associated with the data in the first format, such that the format and functionality information is ignored by any application using the file; and
(iv) enabling the data translated to be reintroduced into an application compatible with the first format from the file, such that whenever any marker denoting a format change is found, the formatting change is ignored by the application compatible with the first format, and the format and functionality information included with the data translated is used to recreate the formatting and the functionality that the data originally exhibited before being translated into the second format.

45. The system of claim 44, wherein the parent application comprises a spreadsheet program, and the translated data include one of a data table and a chart selected from a spreadsheet.

46. The system of claim 44, wherein the second format include hypertext markup language.

47. The system of claim 46, wherein the data translated are incorporated into an existing file.

48. The system of claim 44, wherein the marker comprises a cascading style sheet property.

49. The system of claim 44, wherein the cascading style sheet property is an MSO-Ignore property.

* * * * *